United States Patent
Ng et al.

(10) Patent No.: US 10,720,177 B1
(45) Date of Patent: Jul. 21, 2020

(54) MODE HOP MITIGATION SOLUTIONS IN A HEAT-ASSISTED MAGNETIC RECORDING HEAD

(71) Applicant: Seagate Technology LLC, Cupertino, CA (US)

(72) Inventors: ChoonWei Ng, Singapore (SG); Wei Zhang, Singapore (SG); Harry Tiotantra, Singapore (SG); Utt Heng Kan, Singapore (SG); AikChuan Lim, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/377,585

(22) Filed: Apr. 8, 2019

(51) Int. Cl.
| | |
|---|---|
| *G11B 11/105* | (2006.01) |
| *G11B 5/012* | (2006.01) |
| *G11B 5/00* | (2006.01) |
| *G11B 7/1267* | (2012.01) |
| *G11B 5/60* | (2006.01) |
| *G11B 7/1263* | (2012.01) |
| *G11B 7/126* | (2012.01) |

(52) U.S. Cl.
CPC ............ *G11B 5/012* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,661,591 B1 * | 12/2003 | Rothberg | G11B 5/09 360/48 |
| 9,218,849 B1 | 12/2015 | Trantham et al. | |
| 9,396,062 B1 * | 7/2016 | Sridhara | G06F 11/1068 |
| 10,140,180 B1 | 11/2018 | Sridhara et al. | |
| 2014/0055881 A1 * | 2/2014 | Zaharris | G11B 5/012 360/55 |
| 2014/0136917 A1 | 5/2014 | Patapoutian et al. | |
| 2017/0322844 A1 | 11/2017 | Hong et al. | |

FOREIGN PATENT DOCUMENTS

JP      2000149384 A   *   5/2000

* cited by examiner

*Primary Examiner* — Tan X Dinh
(74) *Attorney, Agent, or Firm* — Mueting Raasch Group (57) ABSTRACT

A method includes writing first data to a first track of a magnetic recording medium of a storage device. First parity sectors corresponding to the first data are written. The first parity sectors have a first size. Second parity sectors corresponding to the first data are written. The second parity sectors have a second size. Second data is written to a second track of the magnetic recording medium. The second track is adjacent to the first track. It is determined whether an unrecoverable data error has occurred on the second track. After writing to the second track and determining that no unrecoverable data error has occurred, the first and second parity sectors corresponding to the first data are released.

20 Claims, 9 Drawing Sheets

MODE HOP MITIGATION SOLUTIONS IN A HEAT-ASSISTED MAGNETIC RECORDING HEAD

SUMMARY

Embodiments described herein involve a method comprising writing first data to a first track of a magnetic recording medium of a storage device. First parity sectors corresponding to the first data are written. The first parity sectors have a first size. Second parity sectors corresponding to the first data are written. The second parity sectors have a second size. Second data is written to a second track of the magnetic recording medium. The second track is adjacent to the first track. It is determined whether an unrecoverable data error has occurred on the second track. After writing to the second track and determining that no unrecoverable data error has occurred, the first and second parity sectors corresponding to the first data are released.

Embodiments described herein involve an apparatus comprising a recording head configured for heat-assisted magnetic recording (HAMR). The recording head comprises a laser. A controller is coupled to the recording head and is configured to write first data to a first track of a magnetic recording medium of a storage device. First parity sectors corresponding to the first data are written. The first parity sectors have a first size. Second parity sectors corresponding to the first data are written. The second parity sectors have a second size. Second data is written to a second track of the magnetic recording medium. The second track is adjacent to the first track. It is determined whether an unrecoverable data error has occurred on the second track. After writing to the second track and determining that no unrecoverable data error has occurred, the first and second parity sectors corresponding to the first data are released.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments described herein relate to a hard-disk drive (HDD) that may contain one or more disks having magnetic recording surfaces upon which data is stored. The recording surfaces may be formatted to include a number of concentric data tracks, the data tracks further divided into segments and/or "sectors" in which the user data is stored. The HDD device may further employ a number of devices in the detection/decoding process to allow for recovering data from a bad read. For example, the sectors may include error correction codes (ECCs), such as Reed-Solomon error correction codes or low-density parity-check codes (LDPC), that allow the data to be recovered from the read sector without requiring additional reads of the recording surface.

If the data cannot be recovered using such devices, an unrecoverable data error (UDE) occurs. When a UDE occurs, the HDD device may incorporate other means for recovering the data that involve re-reading data from the target sector, the entire data track containing the target sector, and/or adjacent data tracks. One method of recovering from a UDE includes super-parity recovery. Super-parity recovery is often utilized in enterprise-level drives and involves grouping smaller segments or sectors into larger super blocks that also include parity information that can be utilized to recover data from the super block. In the event that a UDE is detected, the system may use a redundant outer codeword (OC) parity to recover the failing codeword using an ECC system.

Figure 1:
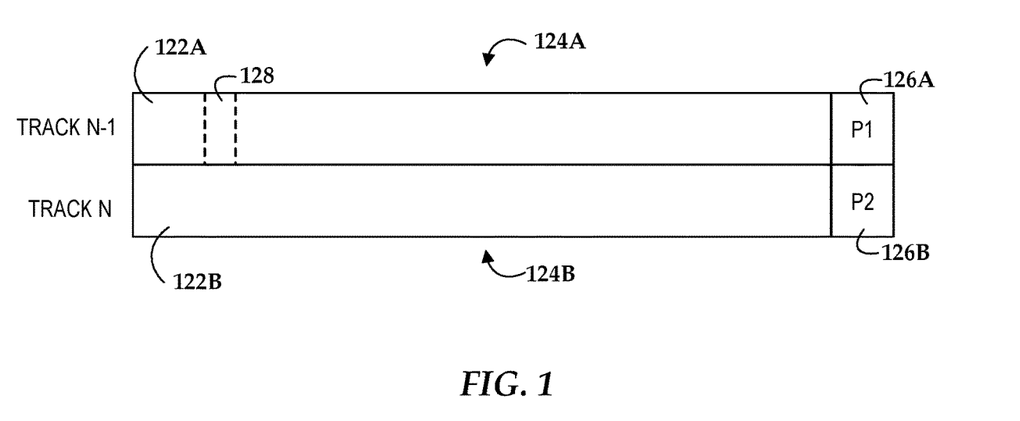
FIG. 1 shows a block diagram showing a layout of tracks on a recording surface of a storage device in accordance with embodiments described herein.

According to embodiments described herein, in an HDD incorporating super parity recovery, the super block comprises a whole data track, with the parity information stored at the end of the track. For example, FIG. 1 shows two data tracks 122A, 122B (referred to herein generally as data tracks 122) on a recording surface of a disk. As shown in FIG. 1, two super blocks 124A and 124B (referred to herein generally as super blocks 124) comprise the entire length L of Track N-1 122A and Track N 122B, respectively. As described above, the super blocks 124 may comprise an aggregation of storage segments or sectors on the data tracks 122, such as sector 128, in which data is stored. In some cases, each of the super blocks 124A and 124B include corresponding parity information 126A and 126B (referred to herein generally as parity information 126), respectively. The parity information 126 may be stored at the end of the data track 122, for example.

According to embodiments described herein, in order to recover from a UDE in a read of a target sector 108, the controller of the HDD device will read the entire data track 122A containing the sector, including the parity information 126A, and utilize the data read from the track and the parity information to recover the data from the target sector.

Embodiments described herein may involve HDDs that use heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer, that shapes and directs the energy from the energy source to the recording medium.

Figure 2A:
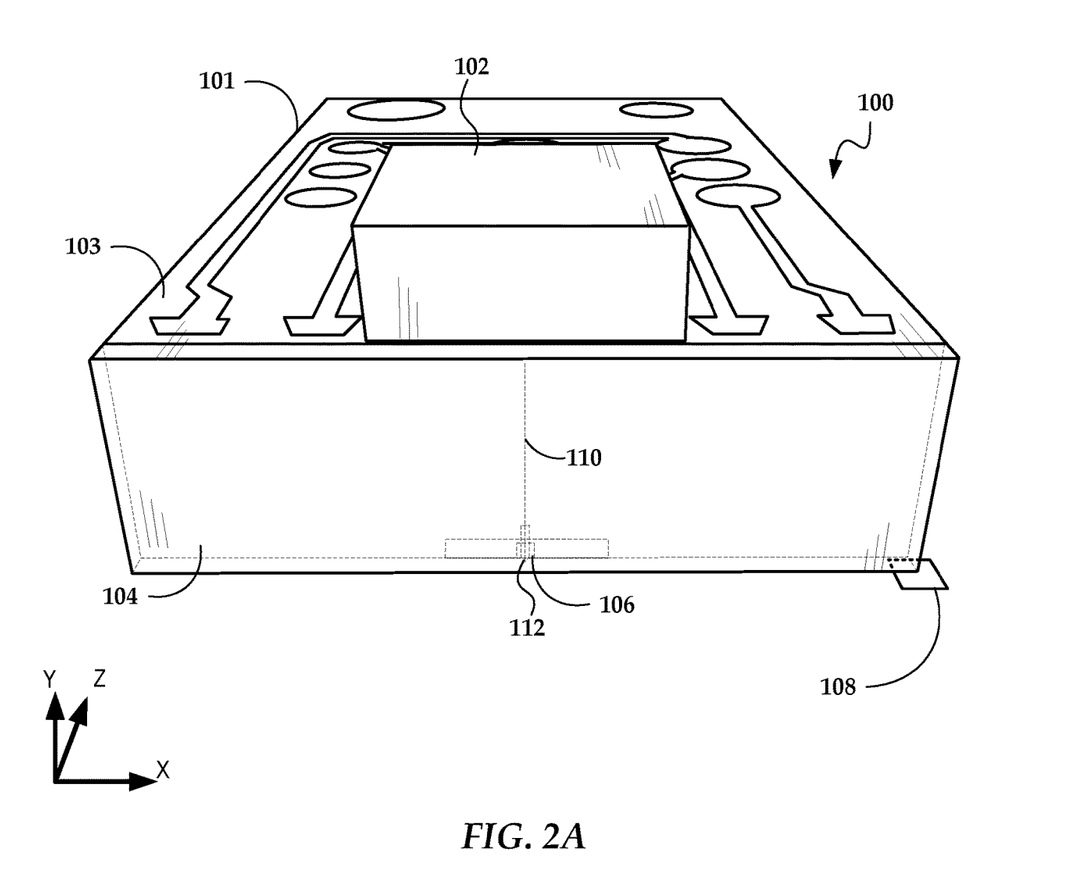
FIGS. 2A and 2B illustrate perspective views of a HAMR write head according to embodiments described herein.

In reference to FIG. 2A, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative y-direction in this view).

Figure 2B:
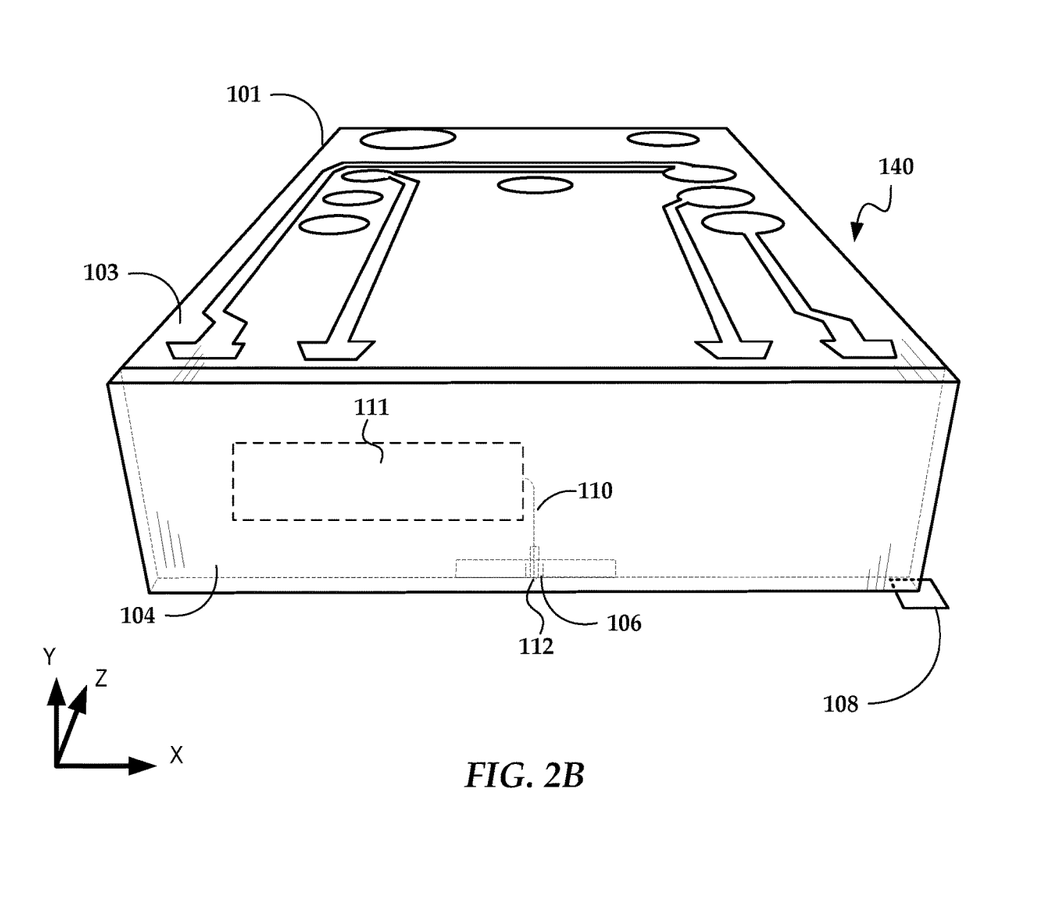

In the present disclosure, hard drive recording heads may use a different type of laser than what is shown in FIG. 2A. A read/write head 120 using this alternate approach is shown in FIG. 2B, wherein components are given the same reference numbers as analogous components in FIG. 2A. At least part of a semiconductor laser 122 or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. Carrying the semiconductor laser 122 with the read/write head substrate, without a separate or intermediate support substrate, can help to reduce the size and simplify the shape and connection methods, and it can also allow for the use of laser geometries and designs that are very different from simple edge-emitting cleaved facet lasers that have been proposed in the past.

In at least some cases, parts of the laser 122 (e.g., GaAs active region) are incompatible with epitaxial growth on the target substrate of a slider, which may be formed of a dielectric such as alumina. As such, the laser 122 cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the integrated laser diode unit 111. This process of transferring non-self-supporting layers of epitaxial-growth-incompatible layers is referred to herein as On-Wafer Laser (OWL) process integration. This process may also be referred to as transfer printing, dry transfer printing, nanoprinting, etc. Embodiments described herein may be implemented in an OWL system.

The waveguide system 110 discussed herein and shown in FIGS. 2A and 2B may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 3:
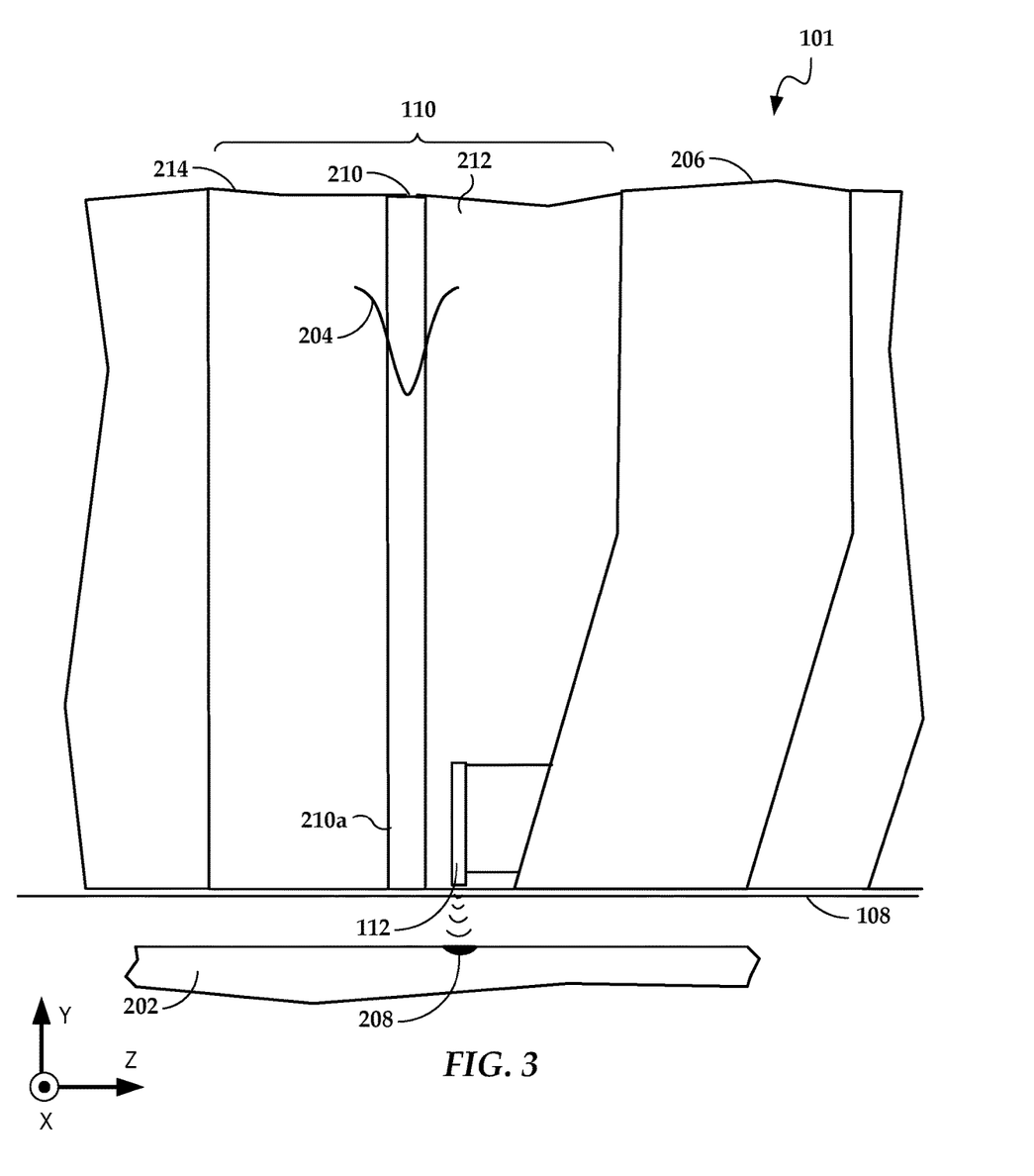
FIG. 3 shows a cross-sectional view illustrating portions of the slider body near the near-field transducer according to embodiments described herein.

In FIG. 3, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (z-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, $Si_3N_4$, $Nb_2O_5$, AlN, $Hf_2O_3$, $Y_2O_3$, GaP, SiC, Si, $AlO_x$, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the crosstrack direction (negative x-direction) where it is directly or indirectly coupled to a light/energy source. For example, a laser diode (e.g., OWL laser diode) may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is a known factor which might cause mode hopping in laser diodes. Mode hopping is problematic for HAMR applications, as mode hopping leads to i) laser output power jumping, ii) a magnetic transition occurring earlier or later that what is expected in the down-track direction, and iii) track width decrease or increase in the cross-track direction.

Figure 4:
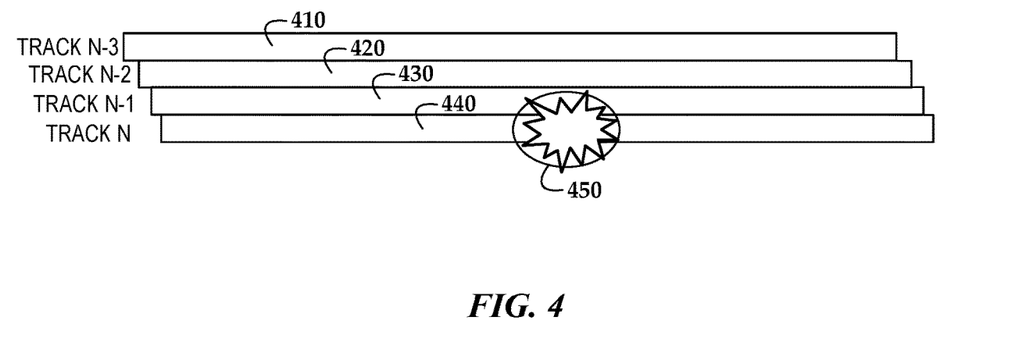
FIG. 4 illustrates four tracks with a mode hop occurring on Track N according to embodiments described herein.

Undesirable mode hopping may introduce unwanted erasing on the adjacent track. This can be a performance limitation for the reliability of a HAMR drive. FIG. 4 illustrates four tracks 410, 420, 430, 440 with a mode hop 450 occurring on Track N 440. As can be observed, the defects from the mode hop 450 will affect both Track N 440 and Track N-1 430. After the mode hop 450 occurs on Track N 440, a normal write retry can rewrite Track N 440, but the damage caused to Track N-1 430 will not have a chance to correct. Although Super Parity can be applied for sector level error correction, the protection may not be enough for mode hop errors as the number of parity sectors per super block is fixed. Blind addition of additional parity sectors throughout the drive will eat drive space. According to embodiments described herein, additional outer code (OC) correction with variable Length Outer code can be applied. The additional OC correction can be determined dynamically and/or in real time to improve the recovery capability by increasing the extent of outer code protection of the sectors in error (associated with mode hop) in a super block.

The track based super parity correction promotes reliability. Existing hardware supports up to 6 of parity sectors that can be generated in a single super block operation. In this case a super block is one track length. For the purpose of drive format efficiency, the number of parity sectors is generally of 1 or 2 sectors per superblock. Once the parity sectors are valid, the number of parity sectors decides how many user sectors can be corrected. When the failed sectors are more than number of parity sectors per super block, data recovery may fail. For a full track write, 1 or 2 parity sectors are written to the end of track. With a variable length OC, the rest of the parity sectors may be generated and stored elsewhere on the HDD such as a cache, for example. These extra parity sectors are generally not saved and will be cleared when a new transfer starts. If these parity sectors can be selectively stored for some critical situation, such as mode hopping, it will reduce the impact caused by unexpected sectors defects and improve the drive reliability.

Embodiments described herein relates to an effective error recovery method for defected sectors caused by mode hopping during a write process. Mode hopping may be detected via hardware. For example, a mode hop can be detected using a temperature based detector in the preamplifier. Based on a mode hopping impact metric, the extended parity sectors information of the adjacent tracks (super blocks) can be stored in Additional Parity Sectors (APS) frame and Additional Parity Sector Table (APST) for each track write. The APS and APST can be used to retrieve error sectors caused by mode hop. The APS and the APST are memory buffers that are specifically set aside for super parity purposes. The APS stores the actual parity sectors, while the APST is a table that gives relevant information to firmware to connect the parities to the exact track they are protecting. Additional parity sectors are used for Mode Hop error and space for APS and/or APST is limited. The limitation is due to cache buffer that needs to be taken away from dataflow purposes which would otherwise be used by dataflow to improve dataflow throughput speed. Therefore, it may be determined if it is needed to keep or delete APS info after each write so that cache buffer space can be utilized optimally. The outer code protection can be used to effectively negate the effect of mode hop impact.

Figure 5:
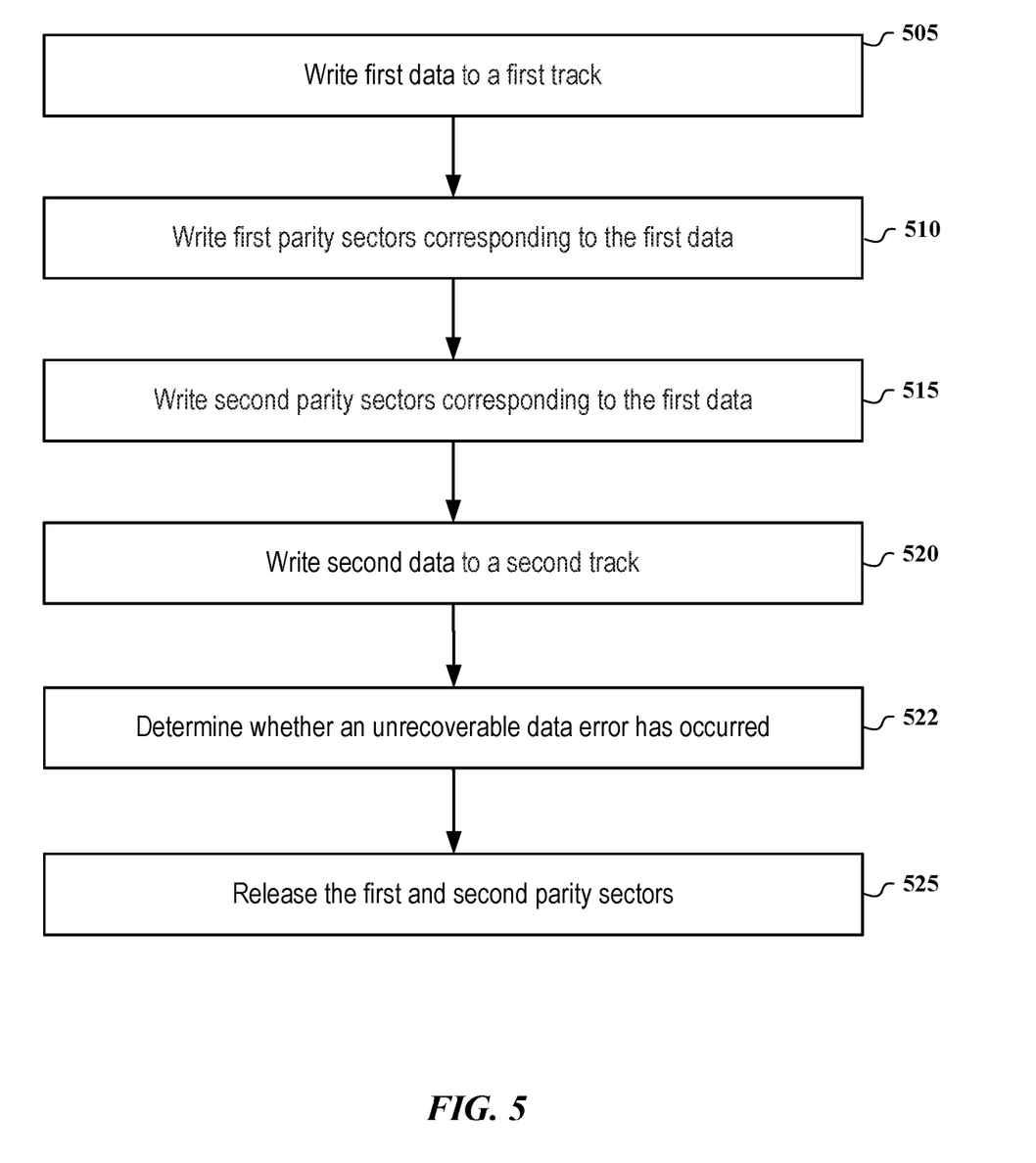
FIG. 5 shows a process for mode hop recovery in accordance with embodiments described herein.

FIG. 5 shows a process for mode hop recovery in accordance with embodiments described herein. First data is written 505 to a first track of a magnetic recording medium of a storage device. In some cases the storage device is a HAMR device. First parity sectors corresponding to the first data are written 510. The first parity sectors have a first size. Second parity sectors corresponding to the first data are stored 515 in a buffer. The second parity sectors have a second size. The first size may be different or equal to the second size. Second data is written 515 to a second track of the magnetic recording medium. It is determined whether an unrecoverable data error and/or mode hop has occurred 522 on the second track. After writing to the second track, the first and second parity sectors corresponding to the first data are released 525 or kept depending on the detection of a mode hop occurrence. If it is determined that an unrecoverable data error and/or mode hop has occurred, the first and second parity sectors are kept. If it determined if a mode hope has not occurred, the first and second parity sectors are released. According to various configurations, first parity sectors and second parity sectors corresponding to the second data are also written. In accordance with embodiments described herein, the first parity sectors are stored at the end of the respective track and the second parity sectors are stored in a buffer and/or cache.

According to embodiments described herein the total parity sector size used for protection is dynamically determined and/or determined in real time. For example, the total parity size may be a sum of the first size and the second size. The first size may be determined based on a configuration of the storage device and the second size may be dynamically determined based on whether additional protection is needed. According to various configurations, the length of the outer code is dynamically determined.

According to embodiments described herein, it is determined whether an unrecoverable data error has occurred and if it is determined that an unrecoverable data error has occurred, the first parity sectors and the second parity sectors are used for error recovery. In some cases, it is determined whether a mode hop has occurred during writing data to the second track. If it is determined that the mode hop has occurred, the first parity sectors and the second parity sectors are used for error recovery.

According to embodiments described herein, after writing first data to the first data track and before writing second data to the second data track, first data is stored in a buffer. After writing data to the second data track, it is determined whether a mode hop has occurred. If it is determined that a mode hop has occurred, the first data is rewritten to the first data track using the first data stored in the buffer.

According to various configurations, writing first parity sectors comprises writing n parity sectors to the first track. In some cases m-n parity sectors are written to a cache. The values n and m may be any predetermined values. For example, m may be equal to 6 such that 6-n parity sectors are written to the cache.

Figure 6:
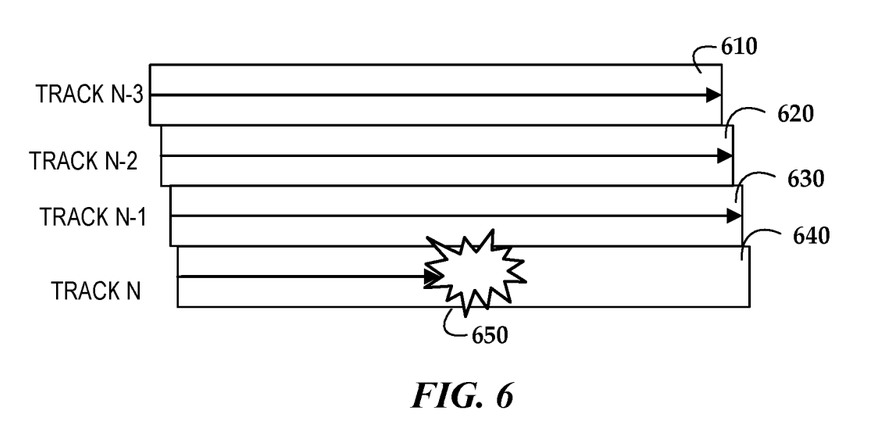
FIG. 6 illustrates an example for mode hop recovery for a sequential write in accordance with embodiments described herein.

FIG. 6 illustrates an example for mode hop recovery for a sequential write in accordance with embodiments described herein. Data is written to Track N-3 610. The write buffer data and APS information for Track N-3 610 is stored. Data is written to Track N-2 620. After the data is written to Track N-2 620, the write buffer data and the APS information for Track N-3 610 is released. The write buffer data and APS information for Track N-2 620 is stored. Data is written to Track N-1 630. After the data is written to Track N-1 630, the write buffer data and the APS information for Track N-2 620 is released. The write buffer data and APS information for Track N-1 630 is stored. Data is written to Track N 640. Partially through the data being written to Track N 640 a mode hop 650 occurs. The mode hop 650 may affect both Track N 640 and Track N-1 630. Because the write buffer data and APS information for Track N-1 630 is stored, the data from Track N-1 630 can be recovered and/or rewritten.

Figure 7:
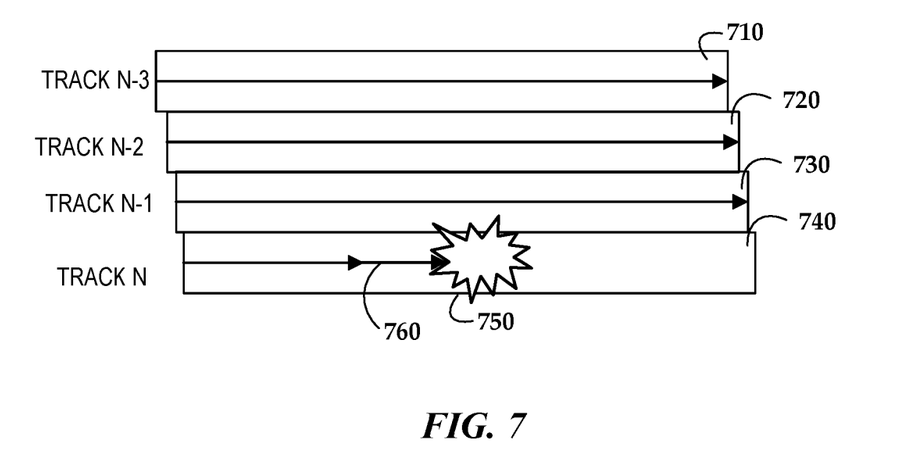
FIG. 7 shows an example for mode hop recovery for a non-sequential write in accordance with embodiments described herein.

FIG. 7 illustrates an example for mode hop recovery for non-sequential write in accordance with embodiments described herein. Data is written to Track N-3 710, Track N-2 720, and Track N-1 730. Data is written to part of Track N 740. In this case, the write stops partially through Track N 740 to switch to another read/write transfer. The current transfer finishes and the write buffer is released. In this scenario, n parity sectors are written on a desired track and 6-n parity sectors can be stored in dynamic random access memory (DRAM) or a cache for Track N-1 730 and Track N 740. When the write resumes 760 on Track N 740 a mode hop 750 occurs. The mode hop 750 may affect both Track N 740 and Track N-1 730. Track N-1 730 is scanned and possible defects are corrected using the on track parity sectors and the additional parity sectors. The Track N-1 730 can then be rewritten with all the correct data. Track N can also be rewritten because the remaining track N data is still in the cache buffer.

According to embodiments described herein, the impact of mode hops can be mitigated by doing a reread of the previous track data and storing that data in some buffer before proceeding with the write operation. For example, during a write operation, all data can be held in buffer so that in case that mode hop occurs, firmware could trigger a rewrite of the previous adjacent track using the buffer data. To facilitate the initial read back operation, it is also possible to keep maximum outer code capability in open bands so that a reread of previous track data can be completed in one revolution time. This may be used to mitigate any performance impact in the protection of data from mode hop impact.

Figure 8:
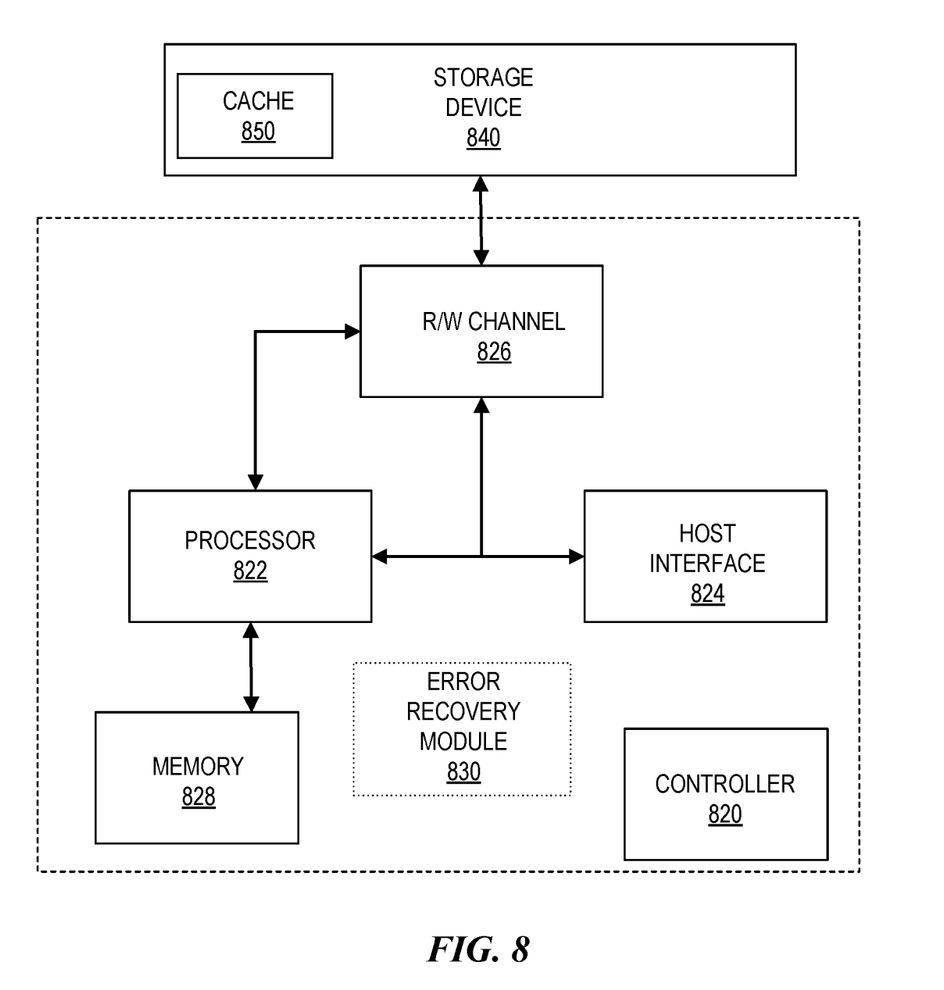
FIG. 8 illustrates a system diagram of the control electronics for the storage device in accordance with embodiments described herein.

The embodiments described herein can be accomplished using a memory controller that controls the operations of the storage device 820 as shown in FIG. 8. The controller 820 may include a processor 822. The processor 822 may implement a host interface 824 allowing the storage device 840 to communicate with a host device, other parts of the storage device, and/or other components, such as a server computer, a personal computer, a laptop, a tablet, a game console, a set-top box, and/or any other electronic device that can be communicatively coupled to the storage device to store and/or retrieve data from the storage device. The processor 822 may process write operations received from the host device by formatting the associated data and transfer the formatted data via a read/write channel 826 through the read/write head 810 and to the recording surface of the disk 802. The processor 822 may further process read operations from the host device by determining the location of the desired data on the surface of the disk, moving the read/write head over the determined location, reading the data from the surface of the disk via the read/write channel 826, correcting any errors and formatting the data for transfer to the host device.

The read/write channel 826 may convert data between the digital signals processed by the processor 822 and the analog signals conducted through the read/write head for reading and writing data to the surface of the disk. The analog signals to and from the read/write head may be further processed through a pre-amplifier circuit. The read/write channel 826 may further provide servo data read from the disk to an actuator to position the read/write head. The read/write head may be positioned to read or write data to a specific sector on the recording surface of the disk by moving the head radially across the data tracks using the actuator while a motor rotates the disk to bring the target sector under the reader elements and/or writer element or the read/write head.

The controller 820 may include a computer readable storage medium or memory 828 for storing processor-executable instructions, data structures and/or other information. The memory 828 may comprise a non-volatile memory, such as read-only memory (ROM) and/or FLASH memory, and a random-access memory (RAM), such as dynamic random access memory (DRAM) and/or synchronous dynamic random access memory (SDRAM). For example, the non-volatile memory and/or the RAM may store a firmware that comprises commands and data used to for perform the operations of the storage device. According to some embodiments, the memory 828 may store processor-executable instructions that, when executed by the processor 822, perform the methods described herein for recovering from a UDE due to a mode hop in the storage device.

The storage device 840 may include other computer-readable media storing program modules, data structures, and/or other data described herein for storing data in the storage device to reduce recovery time from read and/or write errors using embodiments described herein. For example, the storage device may include a cache 850. It will be appreciated by those skilled in the art that computer-readable media can be any available media that may be accessed by the controller 820 or other computing system for the non-transitory storage of information. Computer-readable media includes volatile and non-volatile, removable and non-removable storage media implemented in any method or technology, including, but not limited to, RAM, ROM, erasable programmable ROM (EPROM), electrically erasable programmable ROM (EEPROM), FLASH memory or other solid-state memory technology, compact disc ROM (CD-ROM), digital versatile disk (DVD), high definition DVD (HD-DVD), BLU-RAY or other optical storage, magnetic cassettes, magnetic tape, magnetic disk storage or other magnetic storage devices and the like.

The controller 820 may include an error recovery module 830 configured to implement the mode hop error recovery methods described herein. The error recovery module 830 may be executed in response to a UDE in a read of a target sector on the disk to recover data for the target sector by reading the encompassing super block and the corresponding parity information. According to some embodiments, the error recovery module 830 may be implemented in the controller 820 as software, hardware, or any combination of the two. For example, the error recovery module 830 may be stored in the memory 828 as part of the firmware of the storage device 840 and may be executed by the processor 822 for performing the methods and processes described herein. In some cases, the error recovery module 830 is stored in other computer-readable media accessible by the controller 820. In some embodiments, error recovery module 830 may be implemented in a computing system external to and operably connected to the storage device, such as in a driver module of a host device connected to storage device 840 through the interface 824, for example.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
   writing first data to a first track of a magnetic recording medium of a storage device;
   writing first parity sectors corresponding to the first data, the first parity sectors having a first size;
   writing second parity sectors corresponding to the first data, the second parity sectors having a second size;
   writing second data to a second track of the magnetic recording medium, the second track adjacent to the first track;
   determining whether an unrecoverable data error has occurred on the second track; and
   after writing to the second track and determining that no unrecoverable data error has occurred on the second track, releasing the first and second parity sectors.

2. The method of claim 1, dynamically determining a sum of the first size and the second size.

3. The method of claim 1, determining at least one of the first size and the second size based on a variable length outer code.

4. The method of claim 3, further comprising, dynamically determining the length of the outer code.

5. The method of claim 1, wherein the storage device is a heat-assisted magnetic storage device.

6. The method of claim 1, further comprising if it is determined that an unrecoverable data error has occurred, using the first parity sectors and the second parity sectors for data recovery.

7. The method of claim 1, further comprising:
   determining whether a mode hop has occurred during writing data to the second track; and
   if it is determined that the mode hop has occurred, using the first parity sectors and the second parity sectors for data recovery.

8. The method of claim 1, further comprising:
   after writing first data to the first data track and before writing second data to the second data track, storing first data in a buffer;
   after writing data to the second data track, determining whether a mode hop has occurred; and
   if it is determined that a mode hop has occurred, rewriting the first data to the first data track using the first data stored in the buffer.

9. The method of claim 1, wherein:
   writing first parity sectors comprises writing n parity sectors to the first track; and
   writing second parity sectors comprises writing m-n parity sectors to a cache.

10. The method of claim 9, wherein m is equal to 6.

11. An apparatus, comprising:
    a recording head configured for heat-assisted magnetic recording (HAMR), the recording head comprising a laser; and
    a controller coupled to the recording head and configured to:
      write first data to a first track of a magnetic recording medium of a storage device;
      write first parity sectors corresponding to the first data, the first parity sectors having a first size;
      write second parity sectors corresponding to the first data, the second parity sectors having a second size;
      determine whether an unrecoverable data error has occurred on the second track; and
      after writing to the second track and determining that no unrecoverable data error has occurred on the second track, release the first and second parity sectors.

12. The apparatus of claim 11, wherein the controller is configured to dynamically determine a sum of the first size and the second size.

13. The apparatus of claim 11, wherein the controller is configured to determine at least one of the first size and the second size based on a variable length outer code.

14. The apparatus of claim 13, wherein the controller is configured to dynamically determine the length of the outer code.

15. The apparatus of claim 11, wherein the storage device is a heat-assisted magnetic storage device.

16. The apparatus of claim 11, wherein if it is determined that an unrecoverable data error has occurred the controller is configured to use the first parity sectors and the second parity sectors for data recovery.

17. The apparatus of claim 11, wherein the controller is configured to:
    determine whether a mode hop has occurred during writing data to the second track; and
    if it is determined that the mode hop has occurred, use the first parity sectors and the second parity sectors for data recovery.

18. The apparatus of claim 11, wherein the controller is configured to:
    after writing first data to the first data track and before writing second data to the second data track, store first data in a buffer;
    after writing data to the second data track, determine whether a mode hop has occurred; and
    if it is determined that a mode hop has occurred, rewrite the first data to the first data track using the first data stored in the buffer.

19. The apparatus of claim 11, wherein the controller is configured to:
    write first parity sectors comprises writing n parity sectors to the first track; and
    write second parity sectors comprises writing m-n parity sectors to a cache.

20. The apparatus of claim 19, wherein m is equal to 6.

* * * * *